United States Patent [19]

Rose

[11] 4,264,630
[45] Apr. 28, 1981

[54] MEAT CURING PROCESS USING AN ANIONIC CHARGE ION EMITTER

[75] Inventor: Peter W. Rose, South Barrington, Ill.

[73] Assignee: Rose Packing Company, Inc., Chicago, Ill.

[21] Appl. No.: 120,660

[22] Filed: Feb. 11, 1980

[51] Int. Cl.$^3$ ............................ A23B 4/00; A23L 1/31
[52] U.S. Cl. .................................. 426/231; 426/247; 426/264; 426/641
[58] Field of Search ............... 426/231, 237, 246, 247, 426/264, 265, 266, 641

[56] References Cited

U.S. PATENT DOCUMENTS

| | | | |
|---|---|---|---|
| 1,516,728 | 11/1924 | Hiu | 426/246 X |
| 1,987,244 | 1/1935 | Moore | 426/231 X |
| 2,339,507 | 1/1944 | Nagy et al. | 426/231 X |
| 2,544,724 | 3/1951 | Rentschler | 426/246 |
| 4,196,221 | 4/1980 | Dew | 426/237 X |

Primary Examiner—Robert A. Yoncoskie
Attorney, Agent, or Firm—Dressler, Goldsmith, Shore, Sutker & Milnamow, Ltd.

[57] ABSTRACT

An improved process for curing meats is disclosed wherein the meat is bathed in a recycling pickle solution sorbing pickling agents relative to water, desorbing water and proteinaceous materials relative to pickling agents, the sorbing and desorbing changing with time the voltage reading of a pH meter having a hydrogen ion detecting electrode immersed in the pickle solution, the improvement being the placement of an ion emitter into the pickle solution to emit ions therein to anionically charge at least a portion of the pickling agents, and return the voltage reading toward its initial value.

5 Claims, No Drawings

MEAT CURING PROCESS USING AN ANIONIC CHARGE ION EMITTER

TECHNICAL FIELD

The present invention is directed toward an improved method of curing meat by bathing the meat in a pickle solution containing water and pickling agents, wherein an ion emitter is used to anionically charge pickling agents in the pickle solution and prolong its useful life.

BACKGROUND ART

Over the centuries, various processes have been used for curing meat to both preserve the meat to improve its flavor. Thus, various meats, including red meats, fowl and fish, have been dried in the sun, smoked, and bathed in various curing media.

Today, meats, particularly certain cuts of beef and pork, are cured by bathing in aqueous solutions and dispersions. Methods of bathing the meat include totally or partially submerging the meat in the curing medium, called a pickle solution or pickle, injecting the pickle into the meat by pumping the liquid through veins or arteries, or by pumping the pickle randomly into the meat through hollow needles pushed through the meat's surface. These methods may each be used alone or one may be used in conjunction with the others.

Pickle solutions are usually comprised primarily of sodium chloride to which sodium nitrite, sodium nitrate, ascorbic or isoascorbic acids, various phosphate salts, such as sodium tripolyphosphate, alkali metal mono- and dibasic phosphates and the like may be added. Additionally, pickle solutions may contain components which are not normally considered to be ionic as are the above salts. These ingredients include sugar, spices, edible gums, protein hydrolyzates and smoke flavorants, such as distillates. All of the above pickle components may be referred to as pickling agents.

A smoked flavor has been found to be particularly advantageous in cured meats. Smoking meats in a smoke house requires many hours and a uniform product has been hard to achieve. U.S. Pat. No. 2,844,478 discloses a process for shortening the smoking time. According to this patent, a curing solution is first injected into the meat, the meat is then heated in an oven to a surface temperature of 200°–250° F. and an internal temperature of 115°–130° F., followed by precipitating smoke particles from the air by electrostatic precipitation, and then another heating to a surface temperature of 200°–250° F. The smoke particles are precipitated by passage through rows of ionizing electrodes which cause the smoke particles to become positively charged relative to the grounded meat, and thereby become attracted to the meat. U.S. Pat. No. 2,565,454 discloses a smoking process whereby the smoke particles in the air are positively charged by ionizing electrodes, and are then precipitated onto the grounded, relatively negatively charged, meat.

DESCRIPTION OF THE INVENTION

In the process of curing meat comprising the steps of (a) bathing the meat in a pickle solution comprising water and pickling agents, the meat sorbing a portion of the pickle solution, and particularly the pickling agents relative to the water, and then desorbing excess pickle solution as well as proteinaceous material, the proteinaceous material being cationic relative to the curing meat, and the sorbing and desorbing partially depleting the pickle solution of the pickling agents, increasing the concentration of proteinacious material therein and changing with time the voltage reading of a pH meter having a hydrogen ion detecting electrode immersed in the pickle solution, and (b) recycling the partially pickling agent depleted pickle solution to cure more meat, the improvement wherein an ion emitter is placed in the pickle solution, turned on to emit ions into the pickle solution, anionically charging at least a portion of the pickling agents therein and returning the voltage reading toward its initial value.

BEST MODE FOR CARRYING OUT THE INVENTION

The curing solutions, i.e., pickles, of the present invention may be those of the prior art, and the particular recipe of the pickles are not features of the present invention. Thus, the pickles are aqueous compositions which may contain ionic ingredients such as sodium chloride, sodium nitrite and nitrate, sodium tripolyphosphates, alkali metal phosphates such as mono-, di- and trisodium phosphates, ascorbic acid, and the like. Ingredients usually considered nonionic such as sugar, smoke flavorants such as wood distillates, spices, gums, and the like may also be present. Suitable curing agents include sodium chloride, ascorbic acid, smoke flavorants and spices.

In addition to the above mentioned curing agents, the pickle may also contain edible acids and bases to control the pH value of the composition. These edible acids and bases include hydrochloric acid, acetic acid, citric acid and its mono-, di- and trisodium salts, sodium hydroxide and the like. Of course, the above mentioned phosphate salts and ascorbic acid and the like may also be used to assist in controlling the pH value of the pickle. Preferably, the pickle has a pH value of about 8–10.5, and more preferably a value of about 9–10.

The meat may be bathed in the pickling solution by any one or more of several means. That is, the meat may be partially or wholly submerged in the pickle for a suitable amount of time, or the pickle may be sprayed, splashed or dripped upon the meat to impart the pickling agents, or the pickling agents may be injected into the meat by piercing the meat with hollow needles and forcing the pickle through the needles and into the meat. In preferred practice, the meat is both at least partially submerged in the pickle solution and the pickle solution is injected into the meat by forcing the solution through hollow needles while the needles pierce the meat in random places.

While the meat is bathed in the pickle solution, a portion of the pickle solution is sorbed into the meat. The sorbtion process particularly sorbs the pickling agents relative to the water, thereby partially depleting the pickle solution of the pickling agents.

Excess pickle solution is desorbed from the meat when the meat is taken from the at least partial submersion in the pickle and when the pickle injecting needles are withdrawn from the meat. As the pickling agents are particularly sorbed by the meat relative to the water of the pickle solution, the pickle water is particularly desorbed relative to the pickling agents. Along with the excess pickle solution, small amounts of proteinaceous material, relative to the total meat weight, and adipose materials are also desorbed, the proteinaceous materials being cationic, or positively charged, relative to the curing meat.

As used herein, the term "sorption" in the various grammatical forms is meant to include both absorption and adsorption. Similarly, the term "desorption" in the various grammatical forms is meant to include the reverse processes of de-absorption and de-adsorption.

In a typical curing process, the pickle solution is recycled and may be used again and again for further curing after desorbtion from the meat. Since the above-described curing process depletes the pickle solution of the pickling agents as the meat is bathed in the solution, after a certain time, which depends upon the initial concentration of the pickling agents, the type of meat used and the amount of meat which is pickled, the recycled pickle solution loses strength insofar as the pickling agents are concerned and gains sufficient proteinaceous material and adipose materials such that it must be discarded.

While the adipose material can be effectively screened out of the pickle solution by physical means, such as filtration through a wire mesh, the depletion of pickling agents and increase in concentration of proteinaceous materials are more of a problem. For example, one or more screens having mesh openings of about 1/16–3/16 inch positioned between a holding tank for excess curing solution and the meat, and made from stainless steel or other sanitary material, may be used to physically screen out the desorbed adipose material. These screens will not separate out the valuable desorbed protienacious material which is in solution or suspension, and which protein is wasted when the spent pickle solution is discarded.

Thus, when the pickle is injected into the meat through hollow needles which pierce the meat surface, a portion of the pickle is desorbed, flows over the surface of the meat and then, in preferred practice, into a holding tank at a position below the surface of the meat. The pickle is then repumped into the meat through the hollow needles, and the process repeated until the pickle must be discarded.

The various characteristics of the pickle solution may be monitored in several ways. Illustratively, a pH meter having a hydrogen ion detecting electrode may be immersed in the pickle solution and a change in voltage may be observed with time as the pickling agents are depleted and the proteinaceous material increases in concentration. The change in pH value in the solution may also be monitored and it is found that pickle solutions whose pH values start out at about 10 for a fresh solution may drop in value to a pH of about 7 or less after only several hours of use.

It is now found that an aqueous solution ion emitter such as that manufactured by Ion Air, Inc. may be placed directly into the aqueous pickle solution, and turned on to emit negative ions into the recycling pickle solution. Use of the ion emitter returns the voltage reading of a pH meter using a hydrogen ion detecting electrode immersed in the pickle solution toward its initial value, and prolongs the useful lifetime of the pickle solution.

The ion emitter used herein is an electric device containing ionizing electrodes whose principles of operation are similar to those disclosed in the aforementioned U.S. Pat. Nos. 2,565,454 and 2,844,478, but which is adapted for use in solutions of aqueous electrolytes. Additionally, the electrodes of this ion emitter are reversed relative to those of the above-mentioned prior art, so that the meat is positive or cationic rather than at ground. Thus, the instant ion emitter causes a portion of the materials passing its electrode to become ionized with a negative or anionic charge relative to the meat.

Although the ion emitter may be placed anywhere within the path of flow of the recycling pickle solution, it is preferably placed in a holding tank used to catch the desorbed pickle for recycling. Thus, the ion emitter is placed where it may work on the largest volume of pickle solution, and this facilitates its operation.

The exact mode by which the useful life of the pickle solution is lengthened by use of the present invention is not known. It is believed that the ion emitter acts in part to make at least a portion the desorbed proteinaceous material more anionic and less cationic relative to the curing meat, and as a consequence, the proteinaceous material tends to become sorbed by the curing meat by ionic attraction during recycled bathing of the meat by the pickle solution. The ion emitter is also believed to cause at least a portion of the normally considered non-ionic curing agents such as the smoke flavorants, sugar or spices to become anionically charged relative to the meat and thereby improve their sorption into the meat when the pickle is recycled. Additional or alternative modes of action for the ion emitter are also possible. While the mode of action is not known, it is observed that when using the ion emitter as above described, the voltage reading of the pH meter having a hydrogen ion detecting electrode in the pickle solution returns toward the initial value noted when the pickle solution is fresh.

In using this invention, one may measure voltage, usually in milivolts, of the pickle solution with a pH meter having a hydrogen ion detecting electrode immersed in the solution, and thereafter repeat the desired measurements from time to time to determine the changes with time in the voltage reading. After the voltage reading reaches a desired point at which the effectiveness of the pickle solution may be impaired by continued use, the ion emitter may be turned on to emit the ions into the pickle solution. In preferred practice, the ion emitter is left on during meat bathing and recycling time period so that the maximum benefit of its use may be obtained while the sorption and desorption processes are going on.

Using the preferred practice in which the ion emitter is left on during the bathing and recycling period, the pH meter voltage reading does not observably change and then return toward its initial reading, although this probably does occur at the atomic or molecular level. Rather, when the preferred practice is used, the time to observe a pre-selected voltage reading change of the pH meter is lengthened.

I claim:

1. In the process of curing meat comprising the steps of (a) bathing the meat in a pickle solution comprising water and pickling agents, said meat sorbing a portion of said pickle solution and then desorbing excess pickle solution, as well as proteinaceous material, said proteinaceous material being cationic relative to said curing meat, said sorbing and desorbing partially depleting said pickle solution of said pickling agents, increasing the concentration of proteinaceous material therein and changing with time the voltage reading of a pH meter having a hydrogen ion detecting electrode immersed in said pickle solution, and (b) recycling said partially pickling agent depleted pickle solution to cure more meat, the improvement comprising (c) placing an ion emitter into said pickle solution, and (d) turning said ion emitter on to emit ions into said pickle solution, anionically charging at least a portion of said pickling agents, and returning said voltage reading toward its initial value.

2. The curing process of claim 1 wherein said ion emitter causes a portion of said desorbed proteinaceous material to become less cationic relative to said curing meat.

3. The curing process of claim 2 wherein said less cationic, desorbed proteinaceous material is sorbed by said curing meat.

4. The curing process of claim 1 wherein said ion emitter emits ions during said bathing and recycling steps thereby lengthening the time to observe a voltage reading change of said pH meter.

5. In the method of curing meat comprising the steps of (a) bathing the meat in a pickle solution comprising water and pickling agents, said meat absorbing a portion of said pickle solution and then desorbing excess pickle solution as well as proteinaceous material, said proteinaceous material being cationic relative to said curing meat, said sorbing and desorbing partially depleting said pickle solution of said pickling agents, increasing the concentration of proteinaceous material therein and changing with time the voltage reading of a pH meter having a hydrogen ion detecting electrode immersed in said pickle solution, and (b) recycling said partially pickling agent depleted pickle solution to cure more meat, the improvement comprising (c) placing an ion emitter into said pickle solution, and (d) turning said ion emitter on to emit ions into said pickle solution, causing at least a portion of said desorbed proteinaceous material and pickling agents to become less cationic relative to said meat, whereby said portion of said proteinaceous material and pickling agents are sorbed into the meat, lengthening the time to observe a voltage reading change of said pH meter.

* * * * *

UNITED STATES PATENT OFFICE
CERTIFICATE OF CORRECTION

Patent No. 4,264,630　　　　　　　　Dated April 28, 1981

Inventor(s) Peter W. Rose

It is certified that error appears in the above-identified patent and that said Letters Patent are hereby corrected as shown below:

Column 5, line 19, "absorbing" should be --sorbing--.

Signed and Sealed this

Seventeenth Day of August 1982

[SEAL]

Attest:

GERALD J. MOSSINGHOFF

Attesting Officer　　Commissioner of Patents and Trademarks